(12) United States Patent
Sakata et al.

(10) Patent No.: US 12,481,025 B2
(45) Date of Patent: Nov. 25, 2025

(54) OBJECT SENSING DEVICE AND OBJECT SENSING METHOD

(71) Applicant: Hitachi Astemo, Ltd., Hitachinaka (JP)

(72) Inventors: Kosuke Sakata, Hitachinaka (JP); Masayoshi Kuroda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 551 days.

(21) Appl. No.: 17/916,475

(22) PCT Filed: Jan. 22, 2021

(86) PCT No.: PCT/JP2021/002152
§ 371 (c)(1),
(2) Date: Sep. 30, 2022

(87) PCT Pub. No.: WO2021/199609
PCT Pub. Date: Oct. 7, 2021

(65) Prior Publication Data
US 2023/0221410 A1 Jul. 13, 2023

(30) Foreign Application Priority Data
Apr. 3, 2020 (JP) .................................. 2020-067553

(51) Int. Cl.
*G01S 7/48* (2006.01)
*G01S 17/86* (2020.01)
(Continued)

(52) U.S. Cl.
CPC ............ *G01S 7/4802* (2013.01); *G01S 17/86* (2020.01); *G01S 17/89* (2013.01); *G01S 17/931* (2020.01);
(Continued)

(58) Field of Classification Search
CPC .... G06V 20/56; G06V 20/588; G06V 20/182; G06V 20/10; G06T 2207/10028; G06T 2207/30252; G06T 2207/30256
See application file for complete search history.

(56) References Cited

U.S. PATENT DOCUMENTS 9,453,941 B2 * 9/2016 Stainvas Olshansky .................... G01S 7/4802
10,891,745 B1 * 1/2021 Potter .................... G01S 17/931
(Continued)

FOREIGN PATENT DOCUMENTS

| CN | 116596980 A | * | 8/2023 | ........... G01F 23/292 |
| DE | 102015121270 A1 | * | 6/2016 | ......... G01N 21/4738 |

(Continued)

OTHER PUBLICATIONS

Office Action issued in corresponding Japanese Patent Application No. 2022-511569, with English Machine Translation dated Aug. 15, 2023 (6 pages).

(Continued)

*Primary Examiner* — Gandhi Thirugnanam
(74) *Attorney, Agent, or Firm* — Foley & Lardner LLP

(57) ABSTRACT

An object of the present invention is to provide an object sensing device that classifies an observation point group output by a LiDAR into a real image and a mirror image when a road surface around an own vehicle is wet, and can use the mirror image for detecting the real image. An object sensing device that detects an object around a vehicle based on a point cloud data of an observation point observed by a LiDAR mounted on the vehicle includes: a road surface shape estimation unit that estimates a shape of a road surface; a road surface condition estimation unit that estimates a dry/wet situation of the road surface; and an observation point determination unit that determines a low observation point observed at a position lower than the (Continued)

estimated road surface by a predetermined amount or more when the road surface is estimated to be in a wet situation. The object is detected by using point cloud data of the observation points other than the low observation point and point cloud data of an inverted observation point obtained by inverting the low observation point with reference to a height of the road surface.

4 Claims, 8 Drawing Sheets

(51) Int. Cl.
> *G01S 17/89* (2020.01)
> *G01S 17/931* (2020.01)
> *G06T 7/521* (2017.01)
> *G06T 7/55* (2017.01)
> *G06V 20/56* (2022.01)
> *G06V 20/58* (2022.01)

(52) U.S. Cl.
> CPC ............... *G06T 7/521* (2017.01); *G06T 7/55* (2017.01); *G06V 20/58* (2022.01); *G06V 20/588* (2022.01); *G06T 2207/10028* (2013.01); *G06T 2207/30256* (2013.01)

(56) References Cited

U.S. PATENT DOCUMENTS

| | | | | |
|---|---|---|---|---|
| 11,594,017 | B1* | 2/2023 | Gupta | .................. G01S 15/931 |
| 2008/0129541 | A1* | 6/2008 | Lu | ......................... G06V 20/56 |
| | | | | 340/905 |
| 2009/0120412 | A1 | 5/2009 | Tokuo et al. | |
| 2011/0060478 | A1 | 3/2011 | Nickolaou | |
| 2016/0178802 | A1* | 6/2016 | Stainvas Olshansky | .................... |
| | | | | G01S 17/95 |
| | | | | 356/445 |
| 2021/0354723 | A1* | 11/2021 | McCool | ............... G06V 20/588 |
| 2022/0108119 | A1* | 4/2022 | Margines | ............... G06V 10/56 |
| 2022/0180578 | A1* | 6/2022 | Peterson | ............. G06T 11/206 |
| 2023/0221410 | A1* | 7/2023 | Sakata | .................... G01S 17/89 |
| | | | | 382/106 |
| 2024/0116513 | A1* | 4/2024 | Shane | ................... B60W 40/06 |
| 2024/0116514 | A1* | 4/2024 | Shane | ................. G06V 20/588 |

FOREIGN PATENT DOCUMENTS

| | | | | |
|---|---|---|---|---|
| EP | 3 315 760 A1 | | 5/2018 | |
| EP | 3779501 A1 | * | 2/2021 | ............ B60W 30/08 |
| JP | 2017-166846 A | | 9/2017 | |
| JP | 2018-159570 A | | 10/2018 | |
| JP | 6664360 B2 | * | 3/2020 | ............ B60W 30/00 |
| JP | 2022139739 A | * | 9/2022 | |
| WO | WO-2013/035612 A1 | | 3/2013 | |
| WO | WO-2018166747 A1 | * | 9/2018 | ............... G06T 7/00 |
| WO | WO-2021012987 A1 | * | 1/2021 | ............ G01S 15/931 |

OTHER PUBLICATIONS

German Office Action issued in counterpart Germany Application No. 112020004803.9, dated Apr. 4, 2024, with English translation (17 pages).
English Translation of International Search Report issued in corresponding International Application No. PCT/JP2021/002152, dated Apr. 6, 2021.

* cited by examiner

OBJECT SENSING DEVICE AND OBJECT SENSING METHOD

TECHNICAL FIELD

The present invention relates to an object sensing device and an object sensing method for detecting an object using a set of observation points at which a LiDAR has observed the outside world.

BACKGROUND ART

Some automobiles in recent years are equipped with an external recognition device that detects a three-dimensional object around the own vehicle, a white line position on a road, and the like using a camera, a LiDAR, or the like.

The LiDAR measures a distance to an object by emitting a pulsed laser beam and measuring a time interval until reflected light from the object is received. At the time of distance measurement, the position of the object in the three-dimensional space can be calculated by providing a plurality of irradiation angles of the laser beam or sequentially changing and measuring the irradiation angles. Since the LiDAR is a sensor that detects an object using a laser beam as a medium, the pulsed laser beam is affected by physical phenomena specific to light such as reflection and refraction depending on operation conditions. In particular, in rainy weather, conditions such as raindrops, puddles, and a wet road surface affect the laser beam, and observation data including more disturbance than in good weather is obtained.

As a means for solving this problem, for example, in PTL 1, a laser beam is emitted from a moving device to a detection target region so that rain or snow is not recognized as an obstacle even when heavy rain or heavy snow, a position of a reflection point on an object is detected for each emission direction on the basis of reflected light, the object in the detection target region is recognized on the basis of the position of each reflection point, whether the recognized object is an obstacle is determined, an index value representing the number of reflection points or objects above a ground surface is measured on the basis of the position of each reflection point, and when the index value is equal to or greater than an upper limit value, it is determined whether an object located above the ground surface satisfies an exclusion condition, and the object satisfying the exclusion condition is excluded from the obstacles.

CITATION LIST

Patent Literature

PTL 1: JP 2018-159570 A

SUMMARY OF INVENTION

Technical Problem

However, the technique of PTL 1 only prevents rain or snow from being erroneously identified as an obstacle, and does not consider an adverse effect due to a puddle or a wet road surface in rainy weather.

For example, when the road surface becomes wet due to rainfall or snow, the road surface becomes like a mirror that reflects light. In this case, both visually by a human and in the output of the LiDAR, a mirror image is generated in which a road object is reflected by a wet road surface and the upper and lower sides appear to be inverted below the road surface. As a result, since data obtained by observing a non-existing mirror image is mixed in the output of the LiDAR, it becomes a disturbance at the time of detecting an object existing on the road, and the accuracy of the object detection may be reduced or the non-existing mirror image may be erroneously detected as a real object.

The present invention is to solve such a problem, and an object of the present invention is to provide an object sensing device that classifies an observation point group output by a LiDAR into a real image and a mirror image when a road surface in the vicinity of an own vehicle is wet, and can use the mirror image for detecting the real image.

Solution to Problem

An object sensing device of the present invention for achieving the object is an object sensing device that detects an object around a vehicle based on a point cloud data of an observation point observed by a LiDAR mounted on the vehicle, the object sensing device including: a road surface shape estimation unit that estimates a shape of a road surface; a road surface condition estimation unit that estimates a dry/wet situation of the road surface; and an observation point determination unit that determines a low observation point observed at a position lower than the estimated road surface by a predetermined amount or more when the road surface is estimated to be in a wet situation. The object is detected by using point cloud data of the observation points other than the low observation point and point cloud data of an inverted observation point obtained by inverting the low observation point with reference to a height of the road surface.

Advantageous Effects of Invention

According to an object sensing device of the present invention, since an observation point group output by a LiDAR when the road surface in the vicinity of the own vehicle is wet can be classified into a real image and a mirror image, the mirror image can be used for detecting the real image.

DESCRIPTION OF EMBODIMENTS

Hereinafter, embodiments of the present invention will be described with reference to the drawings.

First Embodiment

First, a first embodiment of the present invention will be described with reference to FIGS. 1 to 12.

Figure 1:
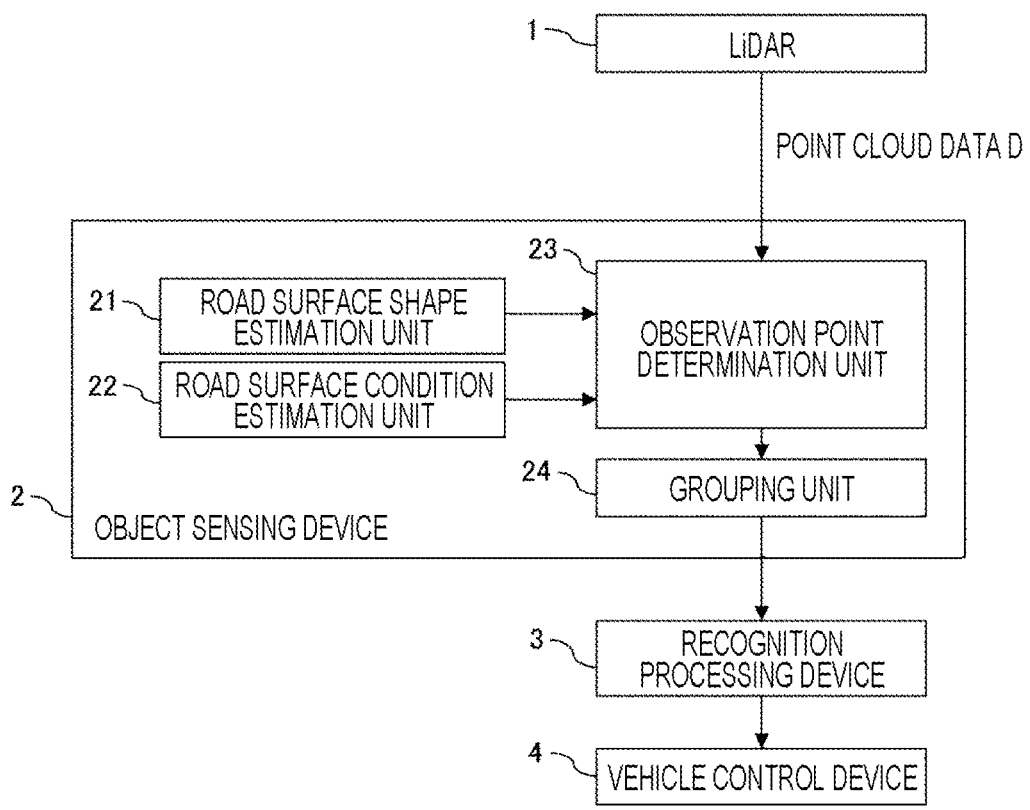
FIG. 1 is a functional block diagram illustrating a configuration example of an object sensing system according to a first embodiment.

FIG. 1 is a functional block diagram illustrating a configuration example of an object sensing system 100 according to the present embodiment. The object sensing system 100 is a system that senses an object (such as a preceding vehicle $V_1$ and a road surface R) in front of the own vehicle $V_0$, and includes a LiDAR 1, an object sensing device 2, a recognition processing device 3, and a vehicle control device 4. In addition, the object sensing device 2 includes a road surface shape estimation unit 21, a road surface condition estimation unit 22, an observation point determination unit 23, and a grouping unit 24. Hereinafter, for convenience, each unit itself may be described as an operation subject, but an actual operation subject of the object sensing device 2, the recognition processing device 3, and the vehicle control device 4 is a processor such as an electronic control unit (ECU) that executes a predetermined program. An independent processor may be provided for each device in FIG. 1, or a single processor may implement the function of each device.

<LiDAR 1 Behavior in Good Weather>

Figure 2:
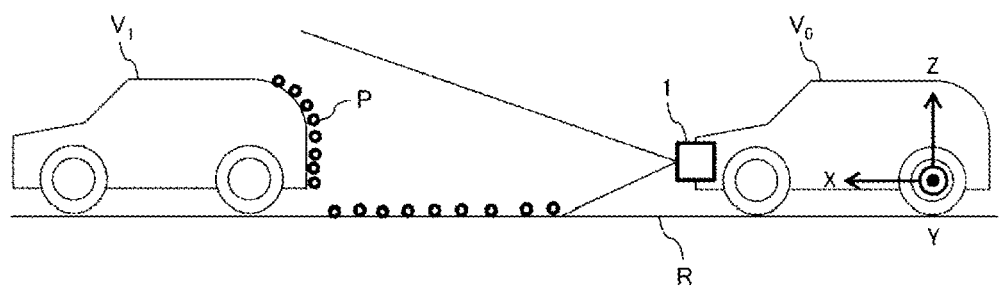
FIG. 2 is a schematic diagram for explaining a behavior of a LiDAR in good weather.

FIG. 2 is a schematic diagram illustrating the behavior of the LiDAR 1 in good weather. As shown here, in the present embodiment, one LiDAR 1 is installed at the height of the bumper of the own vehicle $V_0$, and an orthogonal coordinate system including an X axis (front-rear direction of the own vehicle $V_0$), a Y axis (left-right direction of the own vehicle $V_0$), and a Z axis (up-down direction of the own vehicle $V_0$) is set with an arbitrary position (for example, the center of the rear wheel axle) as an origin. The installation location and the number of LiDARs 1 may be arbitrarily designed, and are not limited to the form of FIG. 2.

The LiDAR 1 can observe a plurality of observation points P in the vertical direction by radiating a plurality of laser beams radially and discretely within a recognizable angular range in the vertical direction. Similarly, even within the recognizable angular range in the horizontal direction, a plurality of observation points P in the horizontal direction can be observed by emitting a plurality of laser beams radially and discretely.

A set of a large number of observation points P observed by the LiDAR 1 in this manner is input to the object sensing device 2 as point cloud data D having three-dimensional coordinate information. In FIG. 2, since the preceding vehicle $V_1$ and the road surface R exist in the recognizable angular range of the LiDAR 1, the point cloud data D output by the LiDAR 1 includes three-dimensional coordinate information indicating the positions of the rear face of the preceding vehicle and the road surface.

<Behavior of LiDAR 1 in Rainy Weather>

Figure 3:
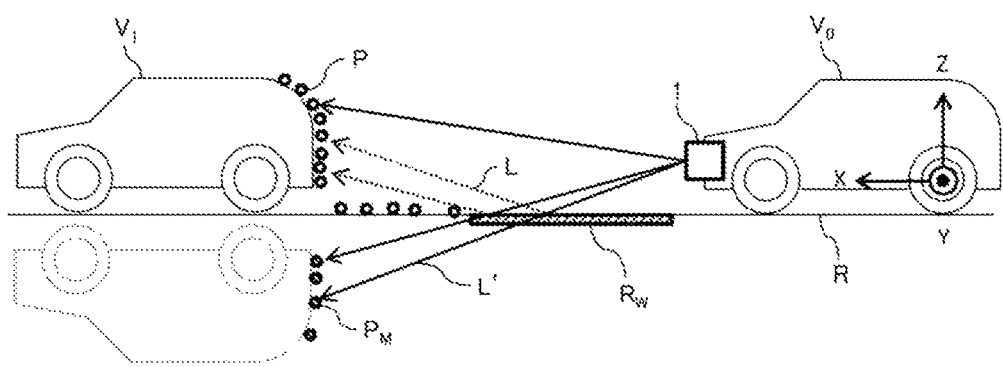
FIG. 3 is a schematic diagram for explaining a behavior of the LiDAR in rainy weather.

On the other hand, FIG. 3 is a schematic diagram for explaining the behavior of the LiDAR 1 in rainy weather. Here, water is accumulated on a part of the road surface R due to rain to form a wet road surface $R_W$, and the preceding vehicle $V_1$, the road surface R, and the wet road surface $R_W$ are irradiated with the laser beam emitted by the LiDAR 1. Since the wet road surface $R_W$ reflects laser beam like a mirror, a part of the laser beam passes through the bent actual trajectory L and is applied to the rear face of the preceding vehicle $V_1$.

The LiDAR 1 calculates three-dimensional coordinate values (x, y, z) of the observation point P using a trigonometric function or the like according to an irradiation angle at the time of irradiation with laser beam and distance information to the observed object. Therefore, the coordinate value of the observation point P observed through the real orbit L reflected by the wet road surface $R_W$ is calculated at the position of the non-existing mirror image observation point $P_M$ on a linear imaginary trajectory L'.

<Extraction Processing of Mirror Image Observation Point>

Figure 4:
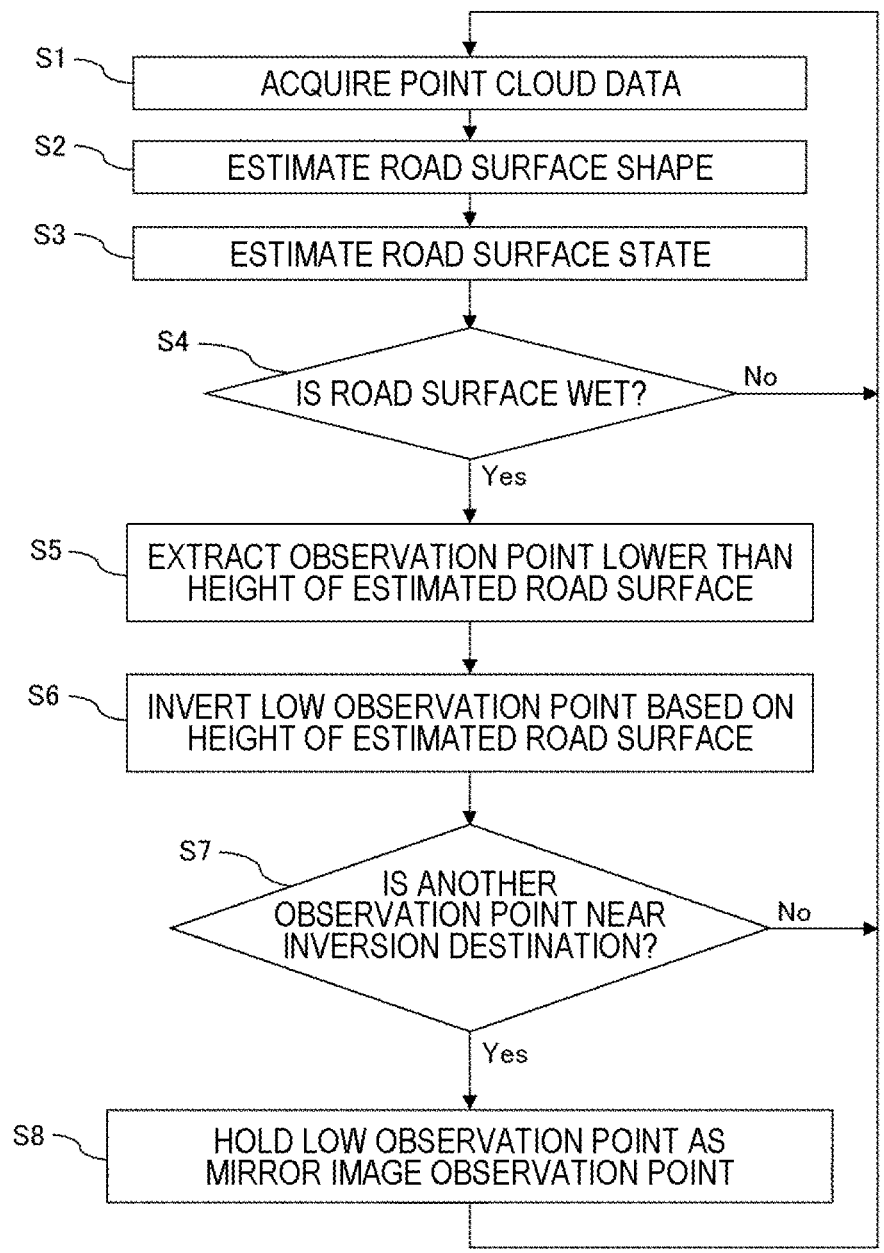
FIG. 4 is a flowchart of extraction processing at a mirror image observation point $P_M$.

If the mirror image observation point $P_M$ illustrated in FIG. 3 is misunderstood as an existing observation point P, there is a possibility that recognition processing by the recognition processing device 3 and vehicle control by the vehicle control device 4 become inappropriate. Therefore, in the object sensing device 2 of the present embodiment, the existing observation point P and the non-existing mirror image observation point $P_M$ are classified according to the flowchart of FIG. 4. In the present embodiment, the processing in FIG. 4 is performed for each sensing cycle of the LiDAR 1.

In Step S1, the LiDAR 1 acquires the point cloud data D. The point cloud data D acquired here is coordinate information of each point of the observation point P as illustrated in FIG. 2 in the case of good weather, and is coordinate information of each point of the observation point P and the mirror image observation point $P_M$ as illustrated in FIG. 3 in the case of rainy weather.

In Step S2, the road surface shape estimation unit 21 of the object sensing device 2 estimates the shape of the road surface R around the own vehicle $V_0$ (hereinafter, referred to as "estimated road surface shape $F_R$"). The estimated road surface shape $F_R$ can be estimated by various methods. For example, any one of the following methods can be used.

(1) The road surface shape is estimated based on the posture of the own vehicle $V_0$ calculated from the output of an inertial sensor that three-dimensionally detects the acceleration and the angular velocity.

(2) The road surface shape is estimated by analyzing the captured image of a camera sensor.

(3) The road surface shape is estimated by analyzing the point cloud data D acquired by the LiDAR 1.

(4) The road surface shape registered in the map data is acquired based on the current position of the own vehicle $V_0$.

In Step S3, the road surface condition estimation unit 22 of the object sensing device 2 estimates the dry/wet situation of the road surface R around the own vehicle $V_0$. The dry/wet situation of the road surface R can be estimated by various methods. For example, any one of the following methods can be used.

(1) The operating signal of the wiper is used as rainfall information. When the wiper is in operation, it is regarded as being raining, and when the wiper is not in operation, it is regarded as not being raining. Then, if it is considered as being raining, it is determined that the road surface is wet.

(2) The output of a raindrop sensor that detects the wet state of the own vehicle $V_0$ is used. In a case where the raindrop sensor detects a raindrop, it is regarded that it is raining, and in other cases, it is regarded that it is not raining. Then, if it is considered as being raining, it is determined that the road surface is wet.

(3) Weather condition data is acquired via the Internet or the like. In this case, not only the current weather indicated by the weather condition data but also the weather condition data from the past to the present may be used to determine the wet situation of the current road surface.

(4) The wet state or the weather of the road surface R is determined by analyzing the captured image of the camera sensor.

(5) A low observation point $P_L$ to be described later is extracted from all the observation points P included in the point cloud data D. When the ratio of the low observation points $P_L$ to all the observation points P exceeds a predetermined threshold value, it is determined that the road surface is wet.

It is determined whether the current road surface condition is wet by any one of these methods or a combination thereof. When it is determined that the road surface is wet, it is desirable to hold the determination result for a predetermined time. This is because even when the weather changes from rainy weather to good weather, it takes some time for the wet road surface to dry.

In Step S4, the observation point determination unit 23 of the object sensing device 2 checks the determination result of the road surface condition estimation unit 22. When the road surface R is in the wet state, the process proceeds to Step S5, and when the road surface R is not in the wet state, the process returns to Step S1. The reason why the process returns to Step S1 when the road surface R is not in the wet state is that if the road surface R is not in the wet state, it is considered that the coordinate value of the mirror image observation point $P_M$ is not included in the point cloud data D acquired by the LiDAR 1 (see FIG. 2), and thus, the processing after Step S5 for excluding the mirror image observation point $P_M$ is unnecessary.

In Step S5, the observation point determination unit 23 extracts the low observation point $P_L$ at a position sufficiently lower than the estimated road surface shape $F_R$ using the information of the estimated road surface shape $F_R$ estimated in Step S2 and an arbitrary threshold $Th_1$.

Figure 5:
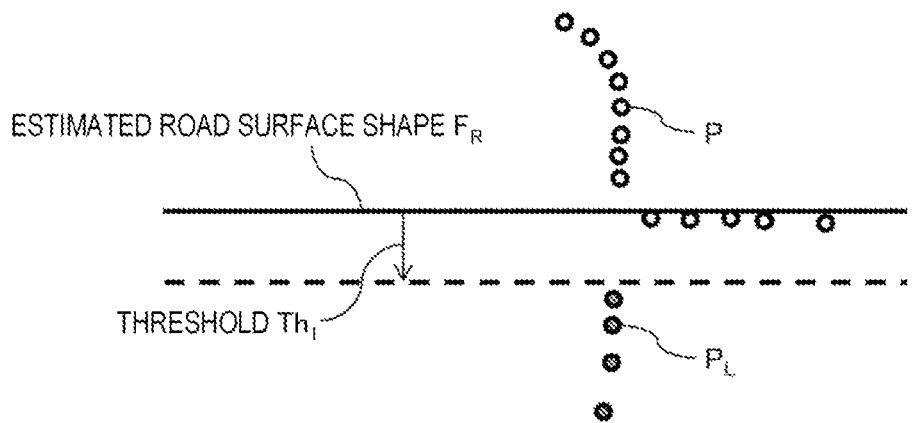
FIG. 5 is an explanatory diagram of extraction processing of a low observation point $P_L$.

FIG. 5 is a diagram for conceptually explaining the processing of Step S5, and illustrates processing of extracting the low observation point $P_L$ from the point cloud data D acquired by the LiDAR 1 in the road surface wet environment as illustrated in FIG. 3. The point cloud data D acquired by the LiDAR 1 in FIG. 3 includes not only the coordinate values of the actual observation points P but also the coordinate values of the non-existing mirror image observation points $P_M$. Therefore, as preprocessing for excluding the coordinate value of the mirror image observation point $P_M$ from the point cloud data D, in Step S5, the low observation point $P_L$ at a position lower than the estimated road surface shape $F_R$ by the predetermined threshold $Th_1$ (for example, 10 cm) or more is extracted.

The following Expression 1 is used to determine whether the observation point P having certain coordinate values (x', y', z') observed by the LiDAR 1 corresponds to the low observation point $P_L$.

$$z' < H_R - Th_1 \quad \text{(Expression 1)}$$

$H_R$: height of estimated road surface shape $F_R$ at coordinates (x', y')

In a case where (Expression 1) is satisfied, the observation point determination unit 23 determines the observation point P as the low observation point $P_L$ and holds the determination result.

In the above description, the threshold value $Th_1$ has been described as a constant value, but the threshold value $Th_1$ may be a variable. For example, the threshold $Th_1$ may be set as a function of a relative distance d from the own vehicle $V_0$ on the basis of a mathematical model or a data table. In a case where the threshold $Th_1$ is proportional to the distance from the own vehicle $V_0$, the possibility that the far observation point P is determined to be the low observation point $P_L$ is lower than the near observation point P. This is a countermeasure against degradation of the accuracy of the estimated road surface shape $F_R$ and degradation of the extraction accuracy of the low observation point $P_L$ as the distance from the own vehicle $V_0$ increases.

In Step S6, as preprocessing for determining whether the low observation point $P_L$ is the mirror image observation point $P_M$, the observation point determination unit 23 inverts the low observation point $P_L$ with reference to the estimated road surface shape $F_R$ and generates an inverted observation point $P_R$.

Figure 6:
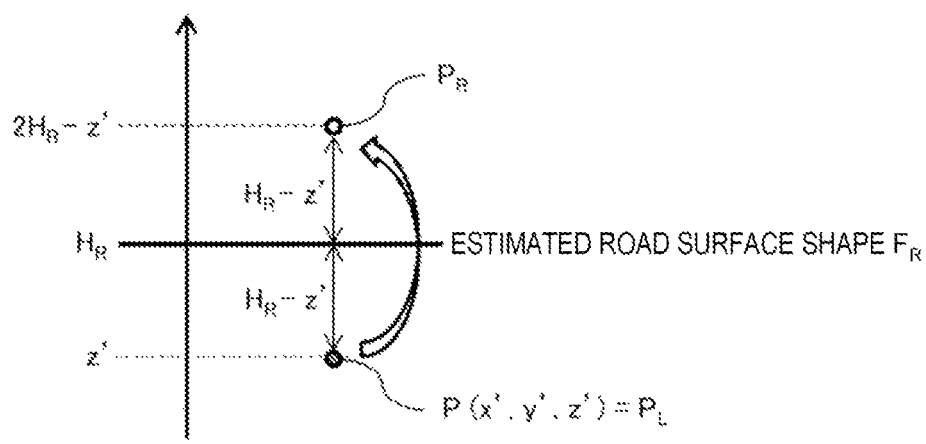
FIG. 6 is an explanatory diagram of a generation processing at an inverted observation point $P_R$.
Figure 7:
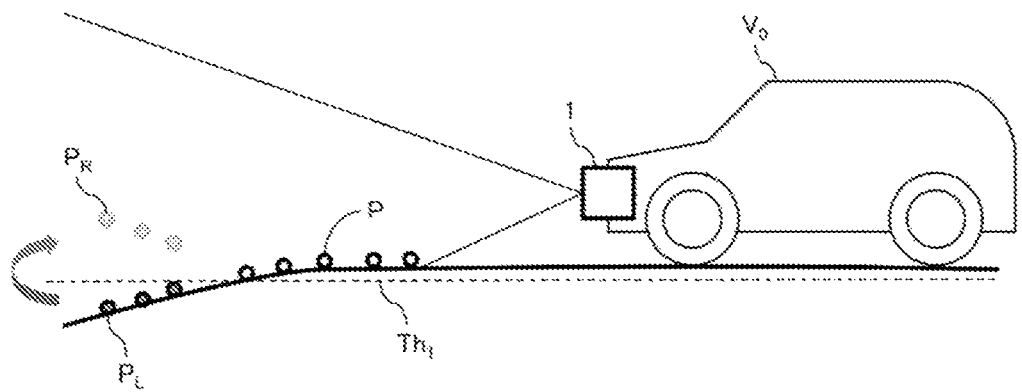
FIG. 7 is an example of a case where a low observation point $P_L$, is an actual observation point P.

FIG. 6 is a diagram for explaining the inversion processing in Step S6. As illustrated, since the height of the low observation point $P_L$ is z', the difference between the height of the estimated road surface shape $F_R$ and the height of the low observation point $P_L$ is $H_R - z'$. Therefore, the coordinate value of the inverted observation point $P_R$ obtained by inverting the low observation point $P_L$ with reference to the estimated road surface shape $F_R$ is (x', y', $2H_R - z'$).

In Step S7, the observation point determination unit 23 checks whether another observation point P exists in the vicinity of the inverted observation point $P_R$. Then, if there is another observation point P, the process proceeds to Step S8, and if there is no other observation point P, the process returns to Step S1. The reason why the process returns to Step S1 in a case where there is no other observation point P in the vicinity of the inverted observation point $P_R$ is that, under the environment where the mirror image observation point $P_M$ is generated, another observation point P should exist in the vicinity of the inverted observation point $P_R$ (see FIG. 3), and if there is no observation point P, it can be determined that the low observation point $P_L$ is a real observation point P (for example, downhill, depression, etc.) (see FIG. 7), and thus Step S8 of holding the low observation point $P_L$ as the mirror image observation point $P_M$ is not necessary.

Figure 8:
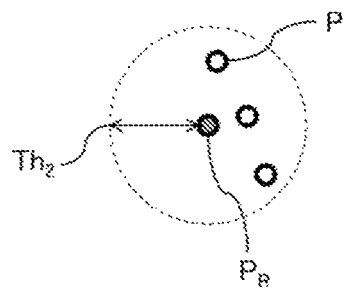
FIG. 8 is a diagram for explaining a part of a process of determining whether a low observation point $P_L$ is a mirror image observation point $P_M$.

FIG. 8 is a diagram for specifically explaining the processing of Step S7. This corresponds to a case where the low observation point $P_L$ is the mirror image observation point $P_M$, and indicates a situation in which another observation point P exists in the spherical region at a certain distance (threshold $Th_2$) from the inverted observation point $P_R$. In this case, since there is a high possibility that these observation points P are points where a real image of the mirror image observation point $P_M$ is captured, it is determined that the low observation point $P_L$ is the mirror image observation point $P_M$. In FIG. 8, the spherical region based on the constant threshold $Th_2$ is exemplified, but the shape of the region used in the processing of Step S7 may be set as a spheroid or a rectangular parallelepiped region, and the size thereof may be arbitrarily set.

Finally, in Step S8, the observation point determination unit 23 holds the low observation point as the mirror image observation point in Step S7.

<Grouping Processing>

When the processing in the observation point determination unit 23 is completed, the grouping unit 24 performs grouping processing for using the plurality of observation points P determined as the mirror image observation points $P_M$ for detection of the object.

Figure 9:
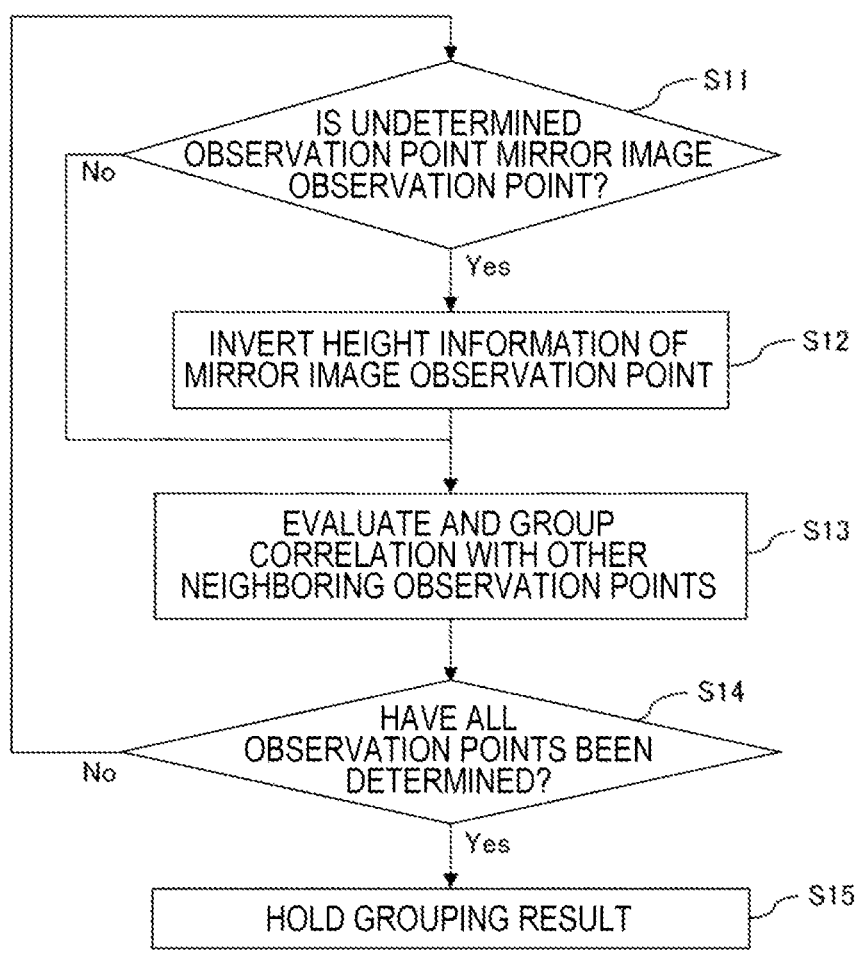
FIG. 9 is a flowchart of grouping processing of the first embodiment.
Figure 10:
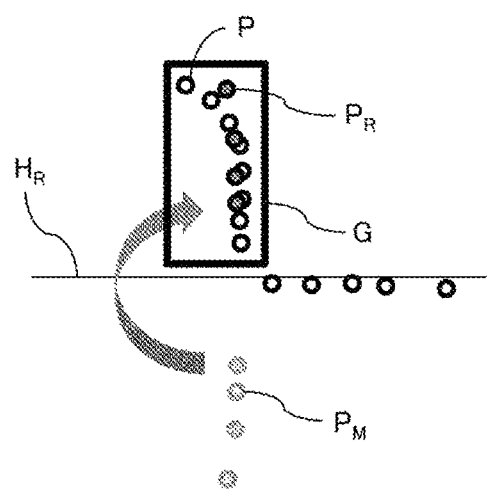
FIG. 10 is a diagram for explaining an example of grouping processing.

FIG. 9 is a flowchart illustrating an example of grouping processing by the grouping unit 24. This grouping processing is performed for each sensing cycle of the LiDAR 1, and is applied to all the observation points P observed in one sensing. After the mirror image observation point determination is performed on all the observation points P, the grouping processing is performed.

The grouping determination is sequentially performed on all the observation points P, and when the observation point P to be determined is the mirror image observation point $P_M$ (S11), the same inversion operation of the height information as in FIG. 6 is performed (S12), and the correlation with other observation points P is evaluated using the inverted observation point $P_R$ to form a group G (S13).

As a correlation evaluation method, for example, there is a method in which a relative distance is evaluated, and when there are other observation points P closer than an arbitrary distance, the observation point groups adjacent thereto are grouped as an observation point group having a strong correlation in which the same object is detected.

The group G generated by the grouping unit 24 is sequentially held. After the grouping determination is performed on all the observation points (S14), the extracted group G is transmitted to the recognition processing device 3 at the subsequent stage. By using this method, since the mirror image observation point $P_M$ can be treated as an observation point of the real image, the number of observation points P at which the same object is detected is increased as compared with the case where similar processing is performed only at the observation point P of the real image, and the information becomes dense, so that there is an effect that the recognition accuracy is increased.

<Other Grouping Processing>

Figure 11:
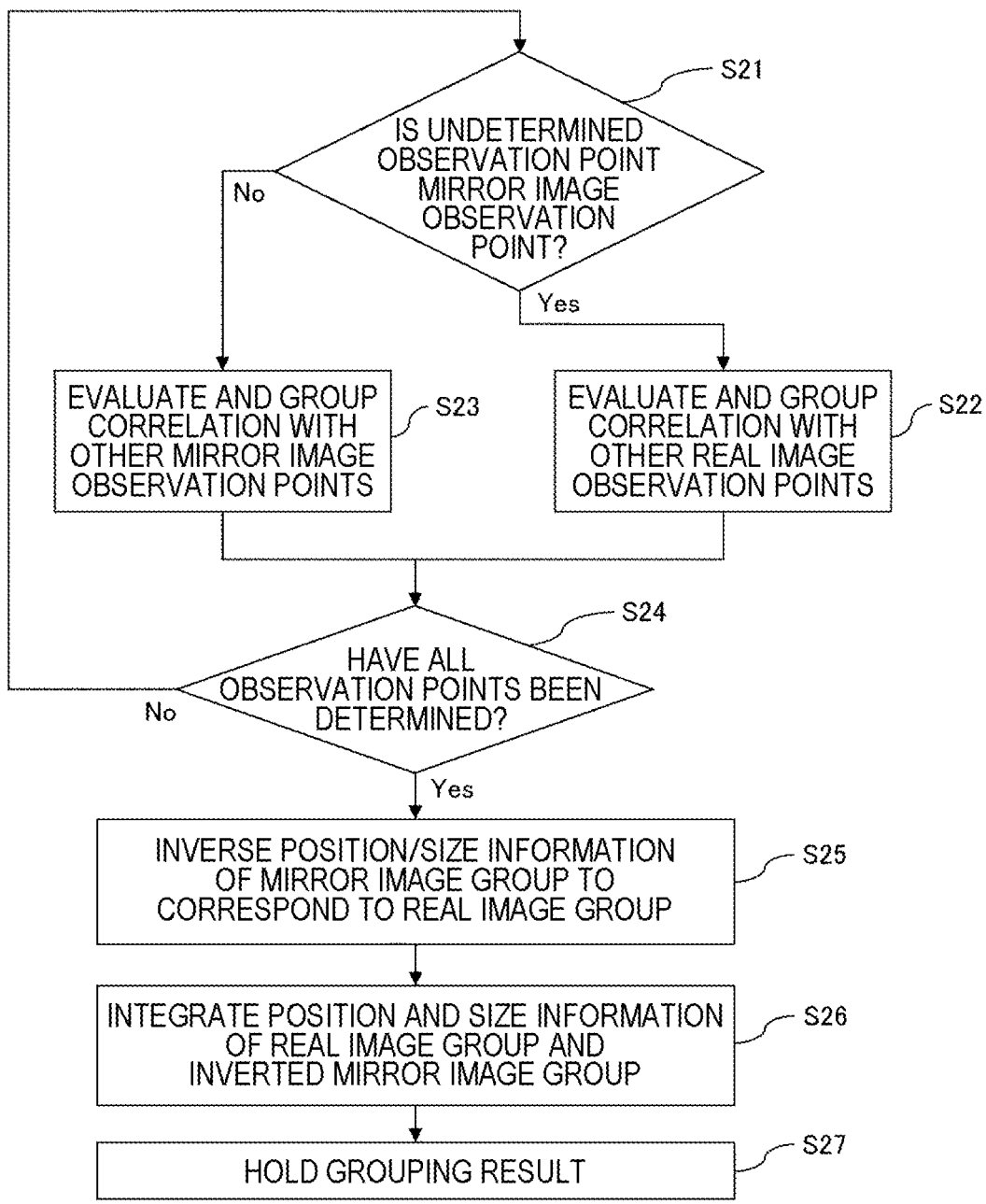
FIG. 11 is a flowchart of another grouping processing of the first embodiment.

The grouping processing by the grouping unit 24 may be in another form as illustrated in FIG. 11. This grouping processing is performed for each sensing cycle of the LiDAR 1, and is applied to all the observation points P observed in one sensing. After the mirror image observation point determination is performed on all the observation points P, the grouping processing is performed.

Figure 12:
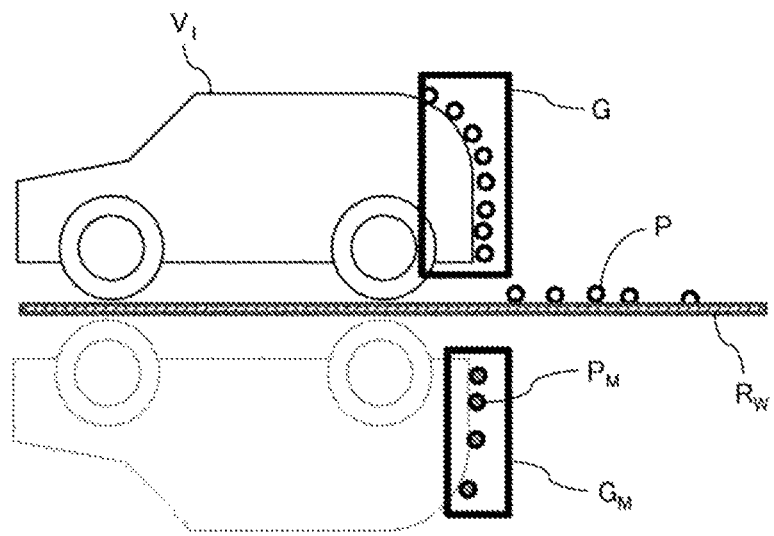
FIG. 12 is a diagram for explaining another example of grouping processing.

The grouping determination is sequentially performed for all the observation points P, and in a case where the observation point P to be determined is the mirror image observation point $P_M$ (S21), a correlation with other mirror image observation points $P_M$ is evaluated and grouping is performed (S23). As a correlation evaluation method here, for example, there is a method in which a relative distance is evaluated, and when there are other mirror image observation points $P_M$ in the vicinity of an arbitrary distance, those adjacent mirror image observation points $P_M$ are grouped as a group $G_M$ of an observation point group having a strong correlation in which a mirror image of the same object is detected (FIG. 12).

In a case where the observation point P to be determined is the observation point P of the real image, grouping is performed as the group G of the observation point group of the real image in the vicinity of the observation point P (S22).

As a result of performing the above grouping determination on all the observation points P (S24), the group $G_M$ of the mirror image observation point group and the group G of the real image observation point group are obtained. Each grouping result is transmitted to the recognition processing device 3 in the subsequent stage. Alternatively, the result of integrating the respective grouping results may be transmitted to the recognition processing device 3 at the subsequent stage, and in this case, the coordinate information of the observation point group and the size information of the grouping result are inverted and used as described above so that the group $G_M$ of the mirror image observation point group becomes the information corresponding to the group G of the real image observation point group (S25). The group $G_M$ of the mirror image observation point group is integrated into the group G of the observation point group of the real image corresponding to the inverted one (S26). By using this method, the recognition processing device 3 at the subsequent stage can distinguish and manage the group G of the observation point group of the real image and the inverted group $G_M$ of the observation point group of the mirror image, and thus, there is an effect that the recognition accuracy is increased by performing processing suitable for each group.

As described above, according to the present embodiment, since the observation point group output by the LiDAR when the road surface in the vicinity of the own vehicle is wet can be classified into the real image and the mirror image, it is possible to avoid misunderstanding the mirror image as the real image.

Second Embodiment

Next, a second embodiment of the present invention will be described. Description of some points in common with the first embodiment will be omitted.

A mirror image on a wet road surface can be perceived as human vision, but a similar phenomenon is observed in a camera sensor. Therefore, even in the object sensing device using the camera sensor, there is a problem that the mirror image is misunderstood as a real image or the like, but this problem can be solved by using the LiDAR 1 together.

Therefore, first, in order to associate the range in which the camera sensor recognizes the outside world defined by the installation posture of the camera sensor with the range in which the LiDAR 1 recognizes the outside world, the position information detected by each sensor is converted as a spatial representation in which the same three-dimensional orthogonal coordinate system is shared between the sensors. At this time, the spatial representation method shared between the sensors is not limited to the three-dimensional orthogonal coordinate system, and for example, a polar coordinate system or a two-dimensional plane may be used. By superimposing each detection result on the shared spatial representation, it is possible to determine whether the object detected by the camera sensor is a real image or erroneous detection in which a mirror image is detected.

Figure 13:
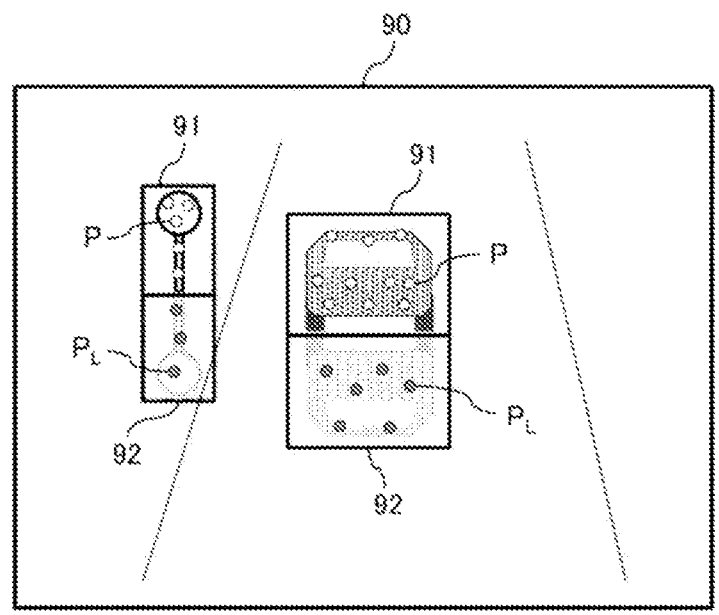
FIG. 13 is a diagram illustrating an example of combination with a camera sensor image of a second embodiment.

FIG. 13 is a diagram illustrating an example of combined processing of the LiDAR 1 and the camera sensor, and object information 91 and object information 92 erroneously detected are detected from a camera sensor image 90 in the recognition processing device 3. The position in the recognition space indicated by each detected object information and the positions indicated by the observation point P and the low observation point $P_L$ of the real image detected by the object sensing device 2 are superimposed on the shared recognition space.

The shared recognition space in FIG. 13 is the same two-dimensional plane as the spatial representation of the camera sensor image 90. In a case where the observation points P and the low observation points PL of the real image are included in the region where the object information 91 and 92 is recognized as an object, a ratio of the number of the observation points P and the low observation points PL included in the real image is calculated for each detection object, and determination is performed using an arbitrarily set value as a threshold. In a case where the low observation points PL are included at a ratio equal to or higher than the threshold, it can be determined that the mirror image is erroneously detected in the object information 92.

Alternatively, the grouping result detected by the object sensing device 2 may be used. In this case, in a case where the group G of the real image observation point groups detected by the object sensing device 2 and the group $G_M$ of the mirror image observation point groups are included in the region where the object information 91 and 92 is recognized as an object, or in a case where the respective detection regions overlap with each other, the group G of the real image observation point groups and the group $G_M$ of the mirror image observation point groups are calculated for each detection object, and the determination is performed using an arbitrarily set value as a threshold. In a case where the group $G_M$ of the mirror image observation point groups is included at a rate equal to or larger than the threshold, it can be determined that the mirror image is erroneously detected in the object information 92.

By performing object detection using the LiDAR 1, the camera sensor image, and the present invention in combination in this manner, it is possible to reduce detection errors as compared with object detection using a conventional camera sensor image.

REFERENCE SIGNS LIST

100 object sensing system
1 LiDAR
2 OBJECT SENSING DEVICE
21 ROAD SURFACE SHAPE ESTIMATION UNIT
22 ROAD SURFACE CONDITION ESTIMATION UNIT
23 OBSERVATION POINT DETERMINATION UNIT
24 GROUPING UNIT
3 RECOGNITION PROCESSING DEVICE
4 VEHICLE CONTROL DEVICE

The invention claimed is:

1. An object sensing device that detects an object around a vehicle based on a point cloud data of observation points observed by a LiDAR mounted on the vehicle, the object sensing device configured to:
   estimate a shape of a road surface;
   estimate a dry/wet situation of the road surface; and
   determine a low observation point observed at a position lower than the road surface by a predetermined amount or more when the road surface is estimated to be in a wet situation, wherein
   (i) the object is detected by using the point cloud data of the observation points other than the low observation point and point cloud data of an inverted observation point obtained by inverting the low observation point with reference to a height of the road surface and
   (ii) the low observation point is determined as a mirror image observation point in a case where another observation point exists around the inverted observation point;
   generate a mirror image group comprising mirror image observation points and a real image group comprising observation points other than the mirror image observation points according to a correlation of the point cloud data;
   invert the mirror image group and combine the mirror image group with the real image group to generate a dense image group that is denser than the real image group; and
   transmit the dense image group to an external device that executes recognition processing based on the dense image group.

2. The object sensing device according to claim 1, further configured to:
   generate the dense image group including both the inverted observation point and the observation point according to a correlation of the point cloud data.

3. The object sensing device according to claim 1, further comprising a camera sensor mounted on the vehicle configured to capture an image comprising object information that identifies one or more regions of the image corresponding to the object, wherein
   in object information of the captured image, first object information corresponding to a region of the image comprising the low observation point is determined as a mirror image of the object.

4. An object sensing method for detecting an object around a vehicle based on point cloud data of observation points observed by a LiDAR mounted on the vehicle, the object sensing method comprising:
   estimating a shape of a road surface;
   estimating a dry/wet situation of the road surface;
   determining a low observation point observed at a position lower than the road surface by a predetermined amount or more when the road surface is estimated as in a wet situation;
   detecting the object by using the point cloud data of the observation points other than the low observation point and point cloud data of an inverted observation point obtained by inverting the low observation point with reference to a height of the road surface; and
   determining the low observation point as a mirror image observation point in a case where another observation point exists around the inverted observation point;
   generating a mirror image group comprising mirror image observation points and a real image group comprising observation points other than the mirror image observation points according to a correlation of the point cloud data;
   inverting the mirror image group and combining the mirror image group with the real image group to generate a dense image group that is denser than the real image group; and
   transmitting the dense image group to an external device that executes recognition processing based on the dense image group.

\* \* \* \* \*